Patented Nov. 28, 1950

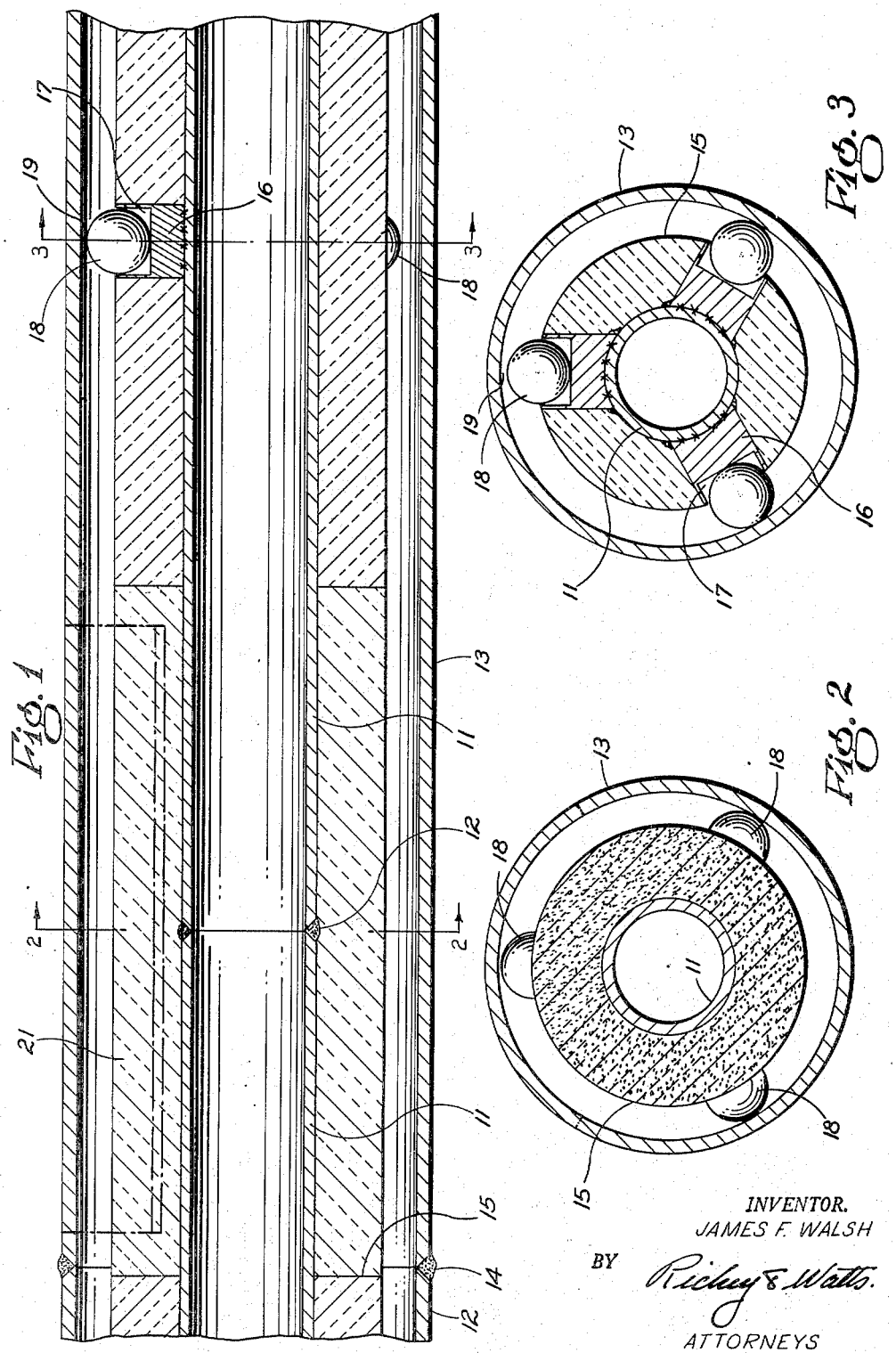

2,531,658

UNITED STATES PATENT OFFICE 2,531,658

SUPPORT FOR A PIPE WITHIN A CONDUIT

James F. Walsh, East Cleveland, Ohio

Application August 30, 1946, Serial No. 693,891

2 Claims. (Cl. 138—48)

This invention relates to a support for a pipe within a protective conduit, and is particularly adapted for installations of the type that are subject to appreciable expansion and contraction for example pipes for steam or other hot fluids.

As is well known to those skilled in the art, steam pipes present many difficult problems in making a satisfactory installation, particularly in long runs and where the pipes are laid from one building to another, either above or below ground.

The pipe must be lagged, and irrespective the type of insulation it is important to protect the lagging with an outer casing preferably disposed in spaced relation therewith. Commonly an outer conduit of sheet metal or ceramic material is employed for this purpose. Differential expansion of the pipe and conduit, which may amount to several feet in long runs of pipe, is an ever-present difficulty.

The present invention contemplates the employment of a continuous conduit, formed by welding sections of commercial steel tubing in end to end relation during the installation of the pipe and conduit assembly. The invention further contemplates the employment of a novel means for supporting the pipe within the conduit which permits longitudinal and rotational movement of the pipe with respect to the conduit, and insures exact centering of the inner and outer tubes to minimize heat loss, protect the lagging and accommodate relative lineal movement between the pipe and conduit.

The supporting means of the invention comprises sockets extended radially from the pipe, with steel balls floating therein. The tubes may thus be readily telescoped or rotated relative to each other to facilitate the welding operation of the pipe sections and final welded assembly of the conduit. After assembly, movement of the pipe within the expansion joints may be accommodated without danger of injury to the welded connections.

The objects of the invention include the following:

The provision of an improved pipe support within a conduit;

The provision of a structure which will accommodate relative movement between the pipe and the conduit;

The provision of a device which will assure concentricity of the pipe within the conduit and will thus safeguard the pipe lagging;

The provision of a structure which will facilitate the ready assembly of the pipe and conduit sections at the building site;

The employment of a conduit of steel tubing or a pipe of a similar character;

The provision of a piping installation which will have a longer life and superior operating characteristics at a competitive price; and A structure which will facilitate inspection and repair of the installation when necessary.

Other objects and advantages of the invention, more or less ancillary to those stated, will be apparent to those skilled in the art from the description herein of the preferred embodiment thereof.

Referring to the drawings:

Figure 1 is a longitudinal section of a pipe installed within a conduit in accordance with the invention;

Figure 2 is a cross section taken on the plane indicated by the line 2—2 in Fig. 1; and Figure 3 is a cross section taken on the plane indicated by the line 3—3 in Fig. 1.

The pipe 11 which conveys the fluid may be of any desired type, and is preferably assembled by butt-welding sections thereof as indicated at 12. The pipe is contained within a conduit 13 of steel tubing or equivalent material, formed by welding the ends thereof as indicated at 14. The pipe is covered by a sleeve of heat-insulating material 15, the nature thereof being immaterial to this invention. When the insulation is applied remote from the site of installation, as in a factory, the end portions of the pipe are exposed for approximately six inches to facilitate the welding operation, such portions of the pipe being covered in place after the pipe lengths are connected and incident movement of conduit into position for final assembly.

The pipe is spaced from the conduit by ball-bearing separators comprising posts 16 of bar stock having cylindrical sockets 17 bored in their outer ends, and having steel balls 18 mounted for floating movement thereon. The posts 16 are welded to the pipe and extend radially therefrom with the ball seated for point contact in the base of the bore. The ball and post assemblies are proportioned to provide a small radial clearance of the balls within the conduit, as indicated at 19 in order to compensate for the irregularities in the inner surface of the conduit and thus avoid binding. Preferably, three separators are mounted in equi-spaced transverse relation at intervals of approximately twelve feet in normal runs. The separators may, however, be staggered circumferentially and spaced longitudinally about three feet apart. Graphite paste or a similar lubricant may be placed in the sockets 17 to prevent the parts from becoming rusted and assure the free rotation of the balls 18.

It will be noted that the sockets 17 are of a depth substantially equal to the radius of the balls, and that the bottoms of the sockets are flat so that any tendency of the balls to bind within the sockets will be eliminated.

In the installation of the improved pipe and conduit assembly, it is highly desirable to use the same length sections of both pipe and conduit, and to stagger the welded joints of each part in a uniform manner. For example, the welds 12 in the pipe may be located about six inches from the welds 14 in the conduit. Thus, with the pipe extending slightly from the conduit, an additional section of pipe may easily be welded thereon. The ball-bearing support of the pipe facilitates the rotation thereof about its axis during the welding operation. After the pipe has been welded at 12, a section of conduit is led over the pipe, the balls being inserted in their sockets as the posts enter the throat of the conduit. The portions of the pipe adjacent the weld 12 are next insulated; then the conduit is drawn into place and rotated about the pipe while the weld 14 is made. In this operation the ball bearings serve to accommodate the rotational movement of the conduit.

For an average installation, the groups of separators should be spaced at intervals of about twelve feet. If a staggered arrangement is used, individual separators should be about three feet apart. The separators should not in any case be located too close to a joint in the conduit, since it is essential to preserve a smooth bearing surface within the conduit and also essential to retain free areas for the purpose of inspection and repair.

By spacing the joints 14 at a uniform distance in the same direction from the pipe welds, the joints 12 may be inspected by cutting a window 21 in the conduit, as indicated by the dot-and-dash lines in Fig. 1. The window may be cut with a torch, and after inspection and repairs are completed, the section of the conduit removed may be welded back in place. The welds 12 may be readily located since the location thereof from the welds 14 has been held to a standard dimension.

A right angle bend in the pipe and conduit assembly may be formed by welding an elbow to the pipe sections, extending the conduit a short distance beyond the elbow welding a cap in the end thereof then cutting an opening in the conduit adjacent the elbow and welding the conduit for the pipe beyond elbow in normal relation thereto. Obviously branch lines, T's, or bends of less than 90° may be formed in a similar manner.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination, a pipe composed of sections of tubing welded together and a conduit surrounding the pipe, the conduit being composed of sections of tubing welded together, the sections composing the pipe being of the same length as the circumjacent sections composing the conduit, the joints in the pipe being spaced a constant distance from the joints in the conduit and being in staggered relation thereto.

2. A pipe and conduit assembly embodying a plurality of pipe sections welded in end to end relation, a plurality of circumambient conduit sections welded in end to end relation, and mechanism for supporting the conduit in spaced concentric relation with the pipe comprising antifriction bearings disposed between the pipe and conduit in spaced relation with the welded joints therein.

JAMES F. WALSH.

REFERENCES CITED

The following references are of record in the file of this patent:

UNITED STATES PATENTS

| Number | Name | Date |
|---|---|---|
| 842,776 | Forbes | Jan. 29, 1907 |
| 2,029,369 | Halliburton | Feb. 4, 1936 |
| 2,308,307 | Robinson | Jan. 12, 1943 |
| 2,409,304 | Morrison | Oct. 5, 1946 |
| 2,414,997 | Atkins | Jan. 28, 1947 |

FOREIGN PATENTS

| Number | Country | Date |
|---|---|---|
| 621,730 | Germany | Oct. 24, 1935 |
| 781,153 | France | May 10, 1935 |